Sept. 20, 1971    W. B. BORST, JR    3,605,850
VOLATILE SEPARATION APPARATUS FOR THERMALLY
UNSTABLE ORGANIC COMPOUNDS
Filed Jan. 31, 1969

INVENTOR:
William B. Borst, Jr.

BY:
James R. Hoalson, Jr.
Joseph C. Mason, Jr.
ATTORNEYS

United States Patent Office 3,605,850
Patented Sept. 20, 1971

3,605,850
VOLATILE SEPARATION APPARATUS FOR THERMALLY UNSTABLE ORGANIC COMPOUNDS
William B. Borst, Jr., Mount Prospect, Ill., assignor to Universal Oil Products Company, Des Plaines, Ill.
Filed Jan. 31, 1969, Ser. No. 795,578
Int. Cl. B01d *1/14, 3/00, 1/04;* C10g *21/12*
U.S. Cl. 159—16S                                      4 Claims

ABSTRACT OF THE DISCLOSURE

Apparatus and process for separation of an organic chemical liquid feed containing at least one thermally unstable constituent and relatively nonvolatile contaminants, to produce a vapor product having substantial freedom from relatively nonvolatile contaminants, at operating conditions below the level of thermal instability of the liquid feed. The apparatus comprises a chamber containing a fluid contacting zone, a vaporization zone above the contacting zone, at least one conduit zone adjacent to the contacting and vaporization zones, and upper and lower fluid separation zones communicated by the conduit zone. Preferred application of the inventive process and apparatus is in the purification of solvent compositions of the type utilized in extracting aromatic hydrocarbons from hydrocarbon mixtures.

FIELD OF THE INVENTION

The present invention relates to a separation process for the removal of relatively nonvolatile contaminants from a thermally unstable organic chemical liquid. More specifically, the present invention relates to the separation of relatively nonvolatile contaminants from a thermally unstable solvent composition of the class utilized in the extraction of aromatic hydrocarbons from mixed hydrocarbon fractions.

The technique of aromatics separation by solvent extraction is well known in the art of hydrocarbon processing. It is further known that the solvents employed in commercial aromatics extraction plants tend to undergo gradual chemical deterioration with continued use, and that a means of solvent regeneration must be employed in order to recover clean solvent from the products of deterioration.

A preferred solvent which may be utilized in such an aromatics extraction process is a solvent of the sulfolane type. The solvent possesses a five membered ring containing one atom of sulfur and four atoms of carbon, with two oxygen atoms bonded to the sulfur atom of the ring. Generically, the sulfolane type solvents may be indicated as having the following structural formula:

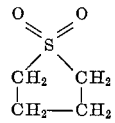

wherein $R_1$, $R_2$, $R_3$, and $R_4$ are independently selected from the group comprising a hydrogen atom, an alkyl group having from one to ten carbon atoms, an alkoxy radical having from one to eight carbon atoms, and an arylalkyl radical having from one to twelve carbon atoms.

Other preferred solvents which may be included within this process are the sulfolenes such as 2-sulfolene or 3-sulfolene which have the following structures:

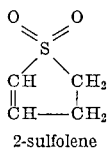
2-sulfolene

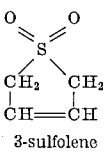
3-sulfolene

Other typical solvents which have a high selectivity for separating aromatics from non-aromatic hydrocarbons and which may be processed within the scope of the present invention are 2-methylsulfolane, 2,4-dimethylsulfolane, methyl 2-sulfonyl ether, n-aryl-3-sulfonyl amine, 2-sulfonyl acetate, diethylene glycol, various polyethylene glycols, dipropylene glycol, various polypropylene glycols, dimethyl sulfoxide, N-methyl pyrrolidone, etc.

The specifically preferred solvent chemical which is processed within the scope of the present invention is sulfolane, having the following structural formula:

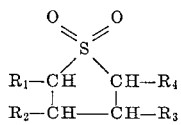

A typical preferred solvent composition comprises a mixture of water and one or more of the organic solvent chemicals. The particularly preferred solvent composition comprises water and sulfolane. In extracting aromatic hydrocarbons from a hydrocarbon mixture, it is known that paraffins are least soluble followed in increasing order of solubility by naphthenes, olefins, diolefins, acetylenes, sulfur containing hydrocarbons, nitrogen containing hydrocarbons, oxygen containing hydrocarbons, and aromatic hydrocarbons. It is the practice to regulate the solubility of the hydrocarbons within the solvent composition by varying the water content thereof. Thus, by adding more water to the solvent, the solubility of all components in the hydrocarbon mixture is decreased, but the solubility difference between components (selectivity) is increased. The net effect is to decrease the number of contacting stages required to achieve a given purity of aromatic extract, or to increase the resulting purity of the aromatic extract when the number of contacting stages is held constant. It is therefore the practice to provide that the solvent composition contain from about 0.1% to about 20% by weight of water and preferably from about 0.1% to about 5% water when the solvent system comprises chemical sulfolane.

DESCRIPTION OF THE PRIOR ART

In the commercial aromatics extraction plants, the rich solvent composition which leaves the extraction zone is sent to a solvent separation zone wherein the hydrocarbon is separated from the solvent. Such solvent separation zone normally comprises one or more distillation columns wherein a nonaromatic fraction is withdrawn for recycle to the extraction zone and the high purity aromatic extract fraction is withdrawn and sent to a subsequent separation zone wherein high purity aromatic chemicals may be recovered. The water content of the rich solvent composition provides a relatively volatile material which is distilled in part from the rich solvent within the solvent separation zone, and which provides an effective means of vaporizing virtually all of the hydrocarbon from the solvent by steam stripping. The resulting lean solvent composition is then recycled to the aromatics extraction zone. The solvent chemicals utilized in the aromatics extraction process are known to be thermally unstable. The instability is not pronounced, however, and only becomes evident upon prolonged recycling of the solvent whereupon the accumulation of the decomposition products becomes evident. The rate of decomposition increases with increasing temperature. Thus, the rate of decomposition of chemical sulfolane in an inert atmosphere is 0.002% per hour at 200° C., 0.010% per hour at 220° C., and 0.020% per hour at 230° C. Similar thermal effects are observed with other solvents and it is therefore desirable to keep temperature levels as low as possible. It is thus the practice with sulfolane solvent systems to set a maximum processing temperature of 350° F., while in diethylene glycol solvent systems and in triethylene glycol solvent systems it is the practice to set a maximum processing temperature of 380° F. In addition, it is the practice to maintain a heat exchanger skin temperature maximum of 450° F. to 500° F. for these specific solvent systems. Thus, it is the practice in the art to define such operating temperatures as being the point of thermal instability for these solvent compositions, although it is known that there is some decomposition occurring below such temperature levels.

Similar points of thermal instability may be readily ascertained for other solvent systems, and for other thermally unstable chemicals not having utility as solvents for aromatic hydrocarbons.

For example, in the synthesis of styrene from ethylbenzene, a mixture of ethylbenzene and styrene is produced. This mixture is distilled to produce ethylbenzene for recycle to the reaction zone as an overhead product, while producing styrene as a bottoms fraction which is subsequently rerun for production of pure styrene product. It is known to those skilled in the art that styrene is thermally degraded by polymerization to produce polystyrene impurities. Such impurities not only result in a substantial yield loss, but they comprise relatively insoluble tarry constituents which may precipitate out on heat exchange equipment as well as on distillation trays, thereby interfering with proper distillation processing during the separation of ethylbenzene from styrene and during the separation of styrene from heavier organic impurities. It has, therefore, been the practice in the art to require that the conditions of distillation be established not to exceed a processing temperature of 220° F. This, then, has been typically defined as the level of thermal instability of styrene, although, it is known that there is some degradation of styrene occurring at temperatures below this level.

It is known that the decomposition which occurs during processing operations with the above identified solvents, results in the production of acidic organic deterioration products as well as polymerization products having a resinous character. It is further known that the decomposition is accelerated by traces of air. The exact nature of the final decomposition products is not fully known, but where sulfolane is the solvent, the decomposition initially produces sulfur dioxide, sulfur trioxide, and olefins in accordance with the following reactions:

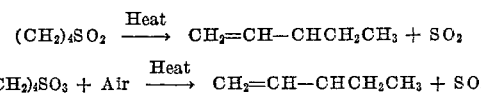

The presence of organic acids within the aqueous solvent and of sulfurous gases within an aqueous sulfolane solvent is known to cause corrosion of the steel equipment utilized, and it is therefore the practice to add organic amine compounds to the sulfolane solvent composition as corrosion inhibitors. Similarly, organic amine compounds are added to glycol solvent compositions and to other solvent compositions as corrosion inhibitors. Suitable organic amines for use in the solvent composition of the aromatics extraction process may be selected from the aliphatic, aromatic, naphthenic, and heterocyclic amines generally, as well as the alkanol amines containing one or more amine group and/or hydroxyl group per molecule. The amine may also be a primary, secondary, or tertiary amine, but the preferred amine utilized in the solvent composition is an alkanol amine and more particularly monoethanol amine. Because of the basic characteristics of the amine inhibitors, these materials react with the acidic solvent decomposition products to form amine salts and amides at the temperature conditions utilized in the aromatic extraction process.

With continued circulation of the solvent composition within the aromatic extraction process, the solvent tends to accumulate resinous polymeric solvent decomposition products, amine salts of the acidic solvent decomposition products, amides of the acidic solvent decomposition products, and relatively monvolatile constituents from other sources. This accumulation of relatively nonvolatile contaminants results in the eventual precipitation of tarry insoluble deposits on the interior surfaces of the processing equipment resulting in reduced heat transfer efficiency due to fouling of heat exchangers, and resulting in reduced separation efficiencies due to fouling of extractor decks and fractionating column trays.

As used herein, the term "relatively monvolatile contaminants" refers to any decomposition products or other contaminants which are relatively monvolatile at a temperature level comprising the level of thermal instability for any thermally unstable organic liquid being processed, whether a solvent liquid or a thermally unstable organic liquid not having utility as a solvent for aromatic hydrocarbons.

It is the practice in aromatics solvent extraction processes to withdraw from the lean solvent recycle stream, a slip-stream of the lean solvent for solvent regeneration and recovery of clean lean solvent composition. The withdrawal rate is normally sufficient to provide that the entire solvent inventory of the aromatics extraction process is passed through the solvent regeneration system once every five to ten days. In this manner the relatively nonvolatile contaminants never accumulate to a sufficiently high concentration to cause deposition of tarry insoluble sludge which is otherwise encountered within the solvent circulating system.

The solvent regeneration system normally comprises a distillation column which is operated under maximum vacuum in order to minimize the vaporization temperature of the thermally unstable solvent chemical. Vaporization is accomplished by provision of a reboiler heat exchanger, and solvent vapor containing organic amine and water is removed overhead, condensed, and returned to the aromatics extraction process as a clean lean solvent liquid. Because the solvent chemical is an expensive material, the practice is not to continuously remove a liquid stream from the bottom of the solvent regenerator for to do so would not only result in the removal of the relatively nonvolatile contaminants but it would also result in the loss of valuable solvent chemical. It is therefore the practice to allow the liquid inventory in the bottom of the solvent regenerator to remain within the system and in effect this provides a reservoir wherein all nonvolatile solvent contaminants are accumulated.

The accumulation of the solvent contaminants in the bottom of the solvent regenerator results in the rapid fouling of the reboiler heat exchanger means, necessitating a reduction in the charge rate of lean solvent to the regenerating unit. Upon the fouling of the reboiler heat exchanger it becomes necessary to shut down the solvent regenerator and discard the liquid inventory of the reboiler. Laboratory analysis of the discarded liquid inventory has disclosed that this liquid is consistently in the neighborhood of 90% pure solvent chemical. Since the solvent chemical is expensive, and since solvent regenerator shutdown and clean-out appears to occur every few weeks, the entire operation is prohibitively expensive.

In order to prolong the duration of solvent regenerator operation it is possible to employ a reboiler heat exchanger of greater surface area or to employ a greater exchanger skin temperature. While use of a larger heat exchanger is technically feasible, in order to provide a sufficiently long period of operation the exchanger becomes prohibitively large in size and great in cost. Similarly, while a greater exchanger skin temperature may be technically feasible it is undesirable since it will promote increased thermal decomposition of the solvent chemical.

A method of prolonging solvent regenerator operation has also been attempted whereby the reboiler liquid inventory has been pumped through the tubes of the heat exchanger at high velocity in an attempt to thereby keep the tube surfaces scoured clean. This technique has not proven to be advantageous since it appears that the high tube velocity results in a higher pressure drop within the exchanger tubes. This results in a boiling point elevation for the solvent within the tube with the net result that inadequate vaporization results unless the tube skin temperature is increased. Since higher skin temperature accelerates the thermal decomposition of the solvent, high tube velocity reboiler systems have not been effective.

SUMMARY OF THE INVENTION

It is, therefore, an object of the present invention to provide a process for the separation of relatively nonvolatile contaminants from a thermally unstable organic liquid.

It is a further object of the present invention to provide a process for the separation of relatively nonvolatile contaminants from a thermally unstable solvent composition of the type utilized in the extraction of aromatic hydrocarbons from hydrocarbon mixtures.

It is a more particular object to provide an improved process for the regeneration of a contaminated sulfolane type solvent and/or a contaminated polyalkylene glycol type solvent of the type used in such aromatic extraction processing.

It is a further particular object to provide a novel vaporization or fluid contacting apparatus wherein these processing objectives may be accomplished.

The inventive separation process and the inventive fluid contacting apparatus utilized therefor are illustrated by the accompanying figures.

Figure 2:
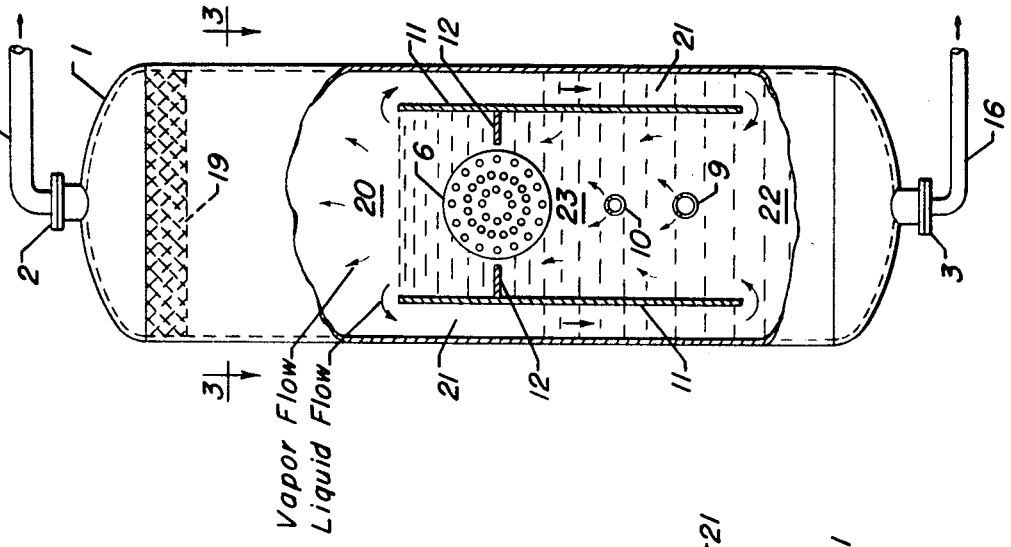
FIG. 2 is a partially cut-away elevational view of the apparatus illustrating the internal construction thereof, and illustrating the process flows occurring therein.

In the inventive separation process, the thermally unstable organic liquid is distilled at a reduced vapor pressure in order to lower the vaporization temperature below the level of thermal instability. Vapor pressure reduction is accomplished at least in part by stripping the liquid with an inert vapor stripping medium. The organic liquid feed and the inert vapor stripping medium are passed through a vaporization zone within the inventive apparatus and vaporization occurs within the zone below the level of thermal instability of the liquid feed. The liquid feed and stripping medium pass through a heat exchanger means within the vaporization zone in a manner sufficient to keep the heat exchanger surfaces relatively free of nonvolatile contaminants which might otherwise precipitate out upon the heat exchanger surfaces and thereby interfere with heat transfer. The vaporized portion of the liquid feed and the stripping medium leave the vaporization zone and pass upwardly within the apparatus, while the nonvaporized liquid leaves the zone and is passed downwardly within the apparatus via a passageway providing isolation from the vaporization zone. The nonvaporized portion of the liquid feed, having an increased concentration of the nonvolatile contaminants, passes into a settling zone at the bottom of the inventive apparatus. Any portion of the nonvolatile contaminants in excess of the solubility thereof within the liquid, will precipitate out in this settling zone.

Therefore, a broad embodiment of the present invention may be characterized as an improvement in a process for the separation of an organic chemical liquid feed containing at least one thermally unstable constituent, and containing relatively nonvolatile contaminants, to provide a vapor product comprising thermally unstable constituent having substantial freedom from relatively nonvolatile contaminants, within a vaporization apparatus comprising a confined vertically elongated shell containing heat exchanger means disposed therein, which improvement comprises producing the vapor product below the level of thermal instability of the thermally unstable constituent by passing the liquid feed into a fluid contacting zone confined within the apparatus below the heat exchanger means and adjacent to at least one conduit zone confined within the apparatus; passing an inert vapor stripping medium into the fluid contacting zone; passing a first liquid fraction hereinafter specified into the fluid contacting zone under conditions sufficient to provide a fluid mixture comprising the liquid feed, the stripping medium, and the first liquid fraction; passing the fluid mixture into a vaporization zone comprising the heat exchanger means and confined within the apparatus adjacent to the conduit zone and above the fluid contacting zone; maintaining the vaporization zone under conditions sufficient to vaporize at least a portion of the thermally unstable constituents at a temperature below the level of thermal instability; passing a vapor-liquid mixture from the vaporization zone into an upper separation zone confined within the apparatus above the vaporization zone and above the conduit zone; separating the vapor-liquid mixture to provide a vapor fraction comprising stripping medium and thermally unstable constituent having substantial freedom from relatively nonvolatile contaminants, and a second liquid fraction containing relatively nonvolatile contaminants; passing the second liquid fraction from the upper separation zone into the conduit zone; passing the second liquid fraction from the conduit zone into a lower separation zone contained within the apparatus below the fluid contacting zone; passing at least a portion of the second liquid fraction from the lower separation zone into the fluid contacting zone as the first liquid fraction specified; and withdrawing at least a portion of the vapor fraction from the apparatus as the desired vapor product.

The present invention may be further characterized as the process defined in the paragraph immediately hereinabove wherein the second liquid fraction is separated within the lower separation zone to provide the first liquid fraction specified, containing a concentration of the relatively nonvolatile contaminants below the concentration thereof in the second liquid fraction.

A further broad embodiment of the present invention may be characterized as a fluid contacting apparatus which comprises in combination a vertically elongated confined chamber having at least one upper fluid port and one lower fluid port; at least one vertically elongated baffle means within the chamber positioned a first finite distance below the upper fluid port and a second finite distance above the lower fluid port, attached to the vertical wall of the chamber in a manner sufficient to provide a space confined between the chamber wall and the face of the baffle means; heat exchanger means within the chamber isolated by the baffle means from the space confined, and spaced at a first locus below the upper fluid port at a finite distance greater than the first finite distance and above the lower fluid port at a finite distance greater than the second finite distance; and fluid inlet means isolated by the baffle means from the space confined, and positioned at a second locus below the first locus and above the lower fluid port at a finite distance greater than the second finite distance.

A still further embodiment of the present invention may be characterized as the apparatus defined in the paragraph immediately hereinabove, wherein a first fluid inlet means is positioned at the second locus, and a second fluid inlet means is isolated by the baffle means from the space confined, and positioned at a third locus below the second locus and above the lower fluid port at a finite distance greater than the second finite distance.

Figure 1:
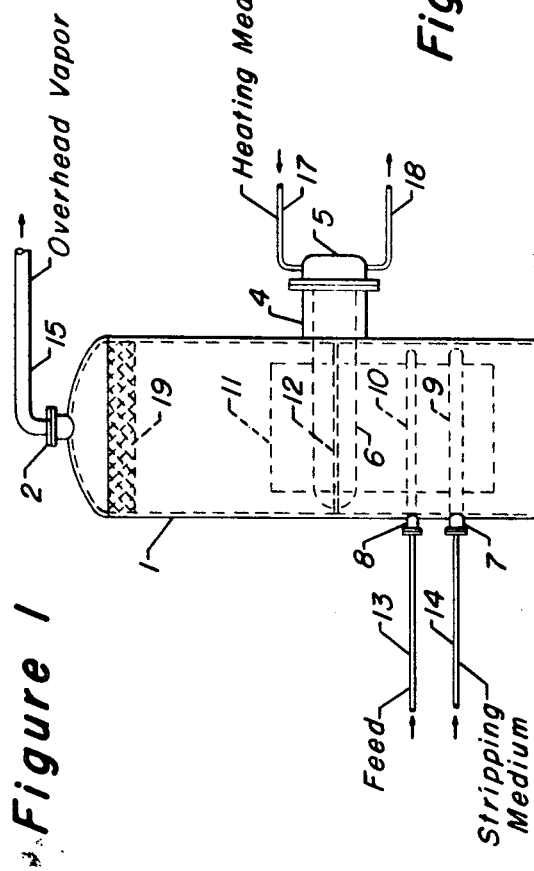
FIG. 1 is a simplified schematic flow diagram illustrating the inventive vaporization process and the inventive apparatus utilized therefor.

The present invention may be more clearly understood by now referring to the accompanying FIG. 1.

FIG. 1 AND EXAMPLE

FIG. 1 is a simplified schematic flow diagram illustrating the inventive process and illustrating the inventive apparatus in a simplified manner.

In FIG. 1, there is shown the inventive fluid contacting apparatus comprising a vertically elongated confined chamber 1, having an upper fluid port 2 and a lower fluid port 3. In the vertical side of the chamber, there is provided a heat exchanger port 4, and passing therethrough and into the chamber 1 is a reboiler heat exchanger means comprising a tube bundle 6 and an external head 5 which is bolted to port 4. Appended to external head 5 there is an inlet line 17 for introducing a heat transfer medium into the bundle 6, and an outlet line 18 for withdrawing heat transfer medium. In addition, the vertically elongated chamber 1 contains a first fluid inlet port 7 below the heat exchanger port 4 and a second fluid inlet port 8 which is located intermediate to port 7 and port 4. A first fluid inlet means 9 projects into the chamber from inlet port 7, and a second fluid inlet means 10 projects into the chamber from inlet port 8. The fluid inlet means 9 and 10 can comprise any typical prior art fluid distribution means, such as a sparger device or a pipe grid fluid distributor.

A vertical baffle means 11 is contained within the chamber 1 and attached to the vertical wall of the chamber in a manner sufficient to confine a space between the face of the baffle and the wall of the chamber. This baffle means 11 is positioned to one side of the heat exchanger bundle 6 and the inlet means 9 and 10. Thus, the chamber is provided with two spaces, one on either side of baffle 11. One space is a confined conduit zone between the face of the baffle and the chamber wall which is isolated by baffle means 11 from the second space which provides a fluid contacting zone and a vaporization zone containing the heat exchanger bundle 6 and the first and second inlet means 9 and 10. In addition, a horizontal baffle means 12 is positioned horizontally across the chamber in the vaporization zone at the same level as the heat exchanger bundle 6 in order to provide that any fluid flow upward through the chamber must be restricted to pass through the heat exchanger bundle 6.

As noted hereinabove, one preferred application for the inventive apparatus is in the regeneration of a solvent composition of the type utilized in the removal of aromatic hydrocarbons from hydrocarbon mixtures. Specifically, the regeneration comprises vaporizing the slovent at a temperature below the level of thermal instability, removing the vapor from the regeneration apparatus, and allowing the nonvolatile contaminants to accumulate within the apparatus.

Referring now to FIG. 1, a lean solvent slip stream enters the process and the apparatus of the present invention via line 13 from an aromatic extract recovery column, not shown, wherein aromatic hydrocarbons have been steam stripped from the rich solvent composition to produce a lean solvent substantially free of hydrocarbon. The lean solvent feed enters the process of the present invention via line 13 at a temperature of 350° F., and at a rate of 47.87 mols/hr. The lean solvent stream is comprised of chemical sulfolane and contains from about 0.5 to about 1.0 weight percent of water, traces of amine corrosion inhibitor, traces of amine salts of acidic sulfolane decomposition products, traces of amides of acidic sulfolane decomposition products, traces of resinous polymeric sulfolane decomposition products, and traces of other relatively nonvolatile contaminants. The contaminated lean solvent stream passes through inlet port 8 and enters the inventive apparatus via inlet means 10.

Stripping steam is introduced into the process of the present invention and into the inventive apparatus via line 14 at a temperature of 235° F. and at a rate of 601.05 mols/hr. The stripping steam passes through the inlet nozzle 7 and enters the apparatus as open steam via inlet means 9. In addition, heat exchange is provided at tube bundle 6 by the introduction of a steam heating medium via line 17. The steam heating medium enters at a pressure of 450 p.s.i.g. and a temperature of 460° F. The steam releases heat to the fluid mixture contained within chamber 1, and the resulting steam condensate is withdrawn via line 18.

The apparatus of the present invention contains a liquid inventory of sulfolane solvent containing relatively nonvolatile contaminants. As the fresh feed enters this liquid inventory via inlet means 10, it is contacted with the liquid inventory and mixed therewith by the steam entering the appaartus via inlet means 9. Stripping steam and liquid sulfolane solvent composition pass upward and through the heat exchanger means 6 wherein at least a part of the sulfolane solvent composition is vaporized. The vaporization occurs at a temperature of 350° F. and at a pressure of 550 mm. of Hg absolute. The mixture of vaporized sulfolane solvent composition, stripping steam vapor, and unvaporized liquid sulfolane solvent composition, passes upwardly through heat exchanger means 6, and the vapor and liquid phases are separated in the space above. The liquid portion of the mixture overflows vertical baffle means 11 and passes downwardly in the space confined between the face of baffle means 11 and the vertical wall of the chamber.

The vaporized portion of the sulfolane solvent composition and the stripping steam pass upwardly in the chamber, and any entrained liquid sulfolane solvent composition is removed from the vapor phase by a typical prior art wire mesh demisting pad 19. A resulting vapor comprising stripping steam and sulfolane solvent composition having substantial freedom from relatively nonvolatile contaminants, passes out of the chamber via fluid port 2 and line 15 at a rate of 648.92 mols/hr., at a temperature of 350° F. and at a pressure of 550 mm. of Hg absolute. In the present example, this overhead vapor stream is passed via line 15 to the stripping zone of the extract recovery column, not shown, of the aromatic extraction process unit. Alternatively, this overhead vapor stream can be condensed and pumped, at least in part, into the aromatic extraction process unit as a liquid stream, wherein it may be combined with any liquid solvent stream in the process unit.

The nonvaporized liquid sulfolane solvent composition which overflows the vertical baffle means 11, passes downwardly in the space confined between the face of the baffle means 11 and the vertical wall of the chamber 1. This liquid portion of the sulfolane solvent contains a higher than normal concentration of relatively nonvolatile contaminants since the major portion of the sulfolane solvent feed liquid has been vaporized. Consequently, as the nonvaporized portion of liquid flows under vertical baffle means 11 into the bottom of the chamber, the relatively nonvolatile contaminants tend to precipitate out and accumulate on the bottom surfaces of the chamber. These non-volatile contaminants can be periodically drained via lower fluid port 3 and line 16. Alternatively, they may be allowed to accumulate in the bottom of the chamber until the concentration of the contaminants in the liquid inventory of the chamber become so high that the nonvolatile contaminants begin to precipitate out on the heat exchanger 6 thereby reducing heat transfer rates. At this point then, the apparatus and the process may be shut down, drained of liquid inventory, and cleaned in the typical prior art manner.

Figure 3:
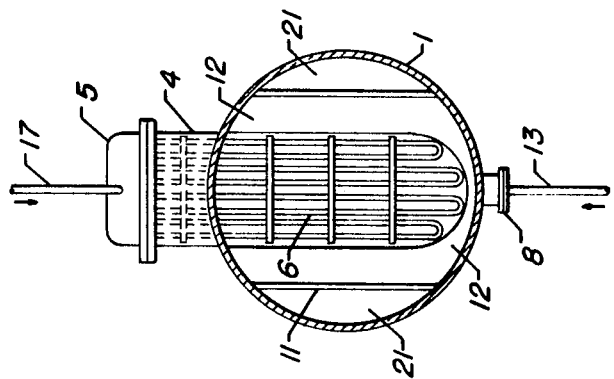
FIG. 3 is a sectional plan view of the inventive apparatus taken along line 3—3 of FIG. 2.

The process and the apparatus of the present invention may now be more clearly understood by referring to FIGS. 2 and 3 wherein a preferred apparatus configuration is illustrated.

FIGS. 2 AND 3

FIG. 2 is a partially cut-away elevational view of the apparatus illustrating the internal construction thereof in one preferred embodiment and further illustrating the process flows occurring therein. FIG. 3 is a sectional plan view of the inventive apparatus of FIG. 2 taken along line 3—3.

Referring now to FIG. 2 there is shown the vertically elongated confined chamber 1 having an upper fluid port 2 and a lower fluid port 3. By means of the partially cut-away view, there is shown a pair of vertical baffle means 11 which are positioned away from the vertical wall of the chamber 1 in a manner to provide a space 21 therein between. Heat exchanger tube handle 6 is confined between the vertical baffle means 11. The first fluid inlet means 9 and the second fluid inlet means 10 are both located below the heat exchanger tube bundle 6 and confined between the vertical baffle means 11. In addition, there is shown the vapor-liquid contacting zone 19 which comprises the typical prior art demisting pads located above and spaced apart from the baffle means 11 and the heat exchanger means 6.

The configuration of the vertical elongated baffle means 11 is more clearly set forth in FIG. 3 wherein it may be seen that the baffle means 11 are attached to the chamber wall on either side of the heat exchanger bundle 6 in a manner sufficient to provide the open space 21 between the face of baffle means 11 and the wall of the chamber 1. In addition, FIG. 3 illustrates side port 4 and the heat exchanger means comprises external head 5 and heat exchanger tube bundle 6 which passes through side port 4 and enters the chamber.

Referring both to FIGS. 2 and 3, there is shown a horizontal baffle means 12 which is attached to the vertical baffle means 11 in a manner sufficient to confine the heat exchanger bundle 6 therein between. Referring in particular to FIG. 3, it will be seen that the horizontal baffle means 12 substantially confines the heat exchanger bundle 6 with a minimum clearance, so that any fluid flow in the apparatus must pass through the heat exchanger means 6, in intimate contact with the tubes containing heat transfer medium.

Referring again to FIG. 2, the lean sulfolane solvent composition enters the apparatus via fluid inlet means 10 which for simplicity's sake is illustrated as a simple sparging device. Stripping steam enters the chamber via fluid inlet means 9 below the inlet means 10. The perforations in fluid inlet means 9 and in fluid inlet means 10 are oriented on the upper side of the inlet means, in order that the flow of stripping steam and the flow of liquid sulfolane feed be directed upward. This is the preferred manner of introduction of liquid feed and stripping medium, since it assures that there will be no backflow under baffle means 11, and it minimizes any turbulence which could otherwise disturb any solids accumulated in the bottom of the chamber.

The space confined between the vertically elongated baffle means 11 below the heat exchanger means 6 and containing fluid inlet means 9 and 10 comprises a fluid contacting zone 23, wherein sulfolane solvent composition feed liquid containing relatively nonvolatile contaminants is contacted with input stripping steam and with the inventory of sulfolane solvent composition contained in the chamber 1. The resulting mixture of liquid sulfolane composition and stripping steam passes upwardly from the fluid contacting zone 23 and into a vaporization zone comprising the heat exchanger means 6. Horizontal baffle means 12 directs the total flow of liquid and vapor through the tubular bundle of the heat exchanger 6 in order that no portion of the mixture may by-pass the vaporization zone. The vaporization zone comprising the heat exchanger 6 is maintained at conditions below the level of thermal instability of the sulfolane solvent.

A portion of the sulfolane solvent is vaporized within the vaporization zone 6 and the mixture of the liquid sulfolane solvent composition, vaporized sulfolane solvent composition, and stripping steam passes into an upper separation zone 20. A vapor fraction is separated from a liquid fraction within the upper separation zone 20. The vapor fraction comprises stripping steam and sulfolane solvent composition having substantial freedom from relatively nonvolatile contaminants. The vapor fraction passes upwardly through the vapor-liquid contacting zone comprising the demisting pads 19 wherein any entrained liquid phase is removed from the vapor by impingement upon the liquid loaded demisting pads. The demisted vapor fraction then passes from the chamber via upper fluid port 2 and line 15.

The liquid fraction which is separated in upper separation zone 20 overflows the vertical baffle means 11 and passes downwardly via conduit zones 21. The liquid fraction passes into the liquid inventory contained at the bottom of the apparatus and into a lower separation zone 22 under the bottom of the vertical baffle means 11. Since the liquid fraction passing into the lower separation zone 22 is nonvaporized sulfolane solvent, it has an increased concentration of the relatively nonvolatile contaminants. Consequently, a portion of the relatively nonvolatile contaminants will precipitate out in lower separation zone 22. The precipitating relatively nonvolatile contaminants produce a relatively tarry insoluble deposit which accumulates at the bottom of the lower separation zone 22. The liquid sulfolane solvent composition which comprises the inventory of the apparatus then flows upwardly into the fluid contacting zone 23, wherein it is mixed with the fresh sulfolane solvent composition introduced via inlet means 10 and with the stripping steam introduced via inlet means 9.

By operation of the inventive apparatus in the manner shown, it will be readily apparent to those skilled in the art that the prior art problem of heat exchanger fouling is in great part eliminated, since the liquid which passes through the heat exchanger bundle 6 is not highly concentrated in relatively nonvolatile contaminants in the manner experienced in prior art operations. In addition, the presence of stripping steam tends to scour the heat exchanger tubes in a manner sufficient to provide a cleaning effect in order to maintain the tubes surfaces relatively free of insoluble deposits.

FIG. 4

Figure 4:
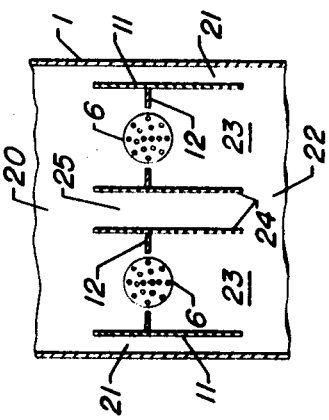
FIG. 4 is a removed sectional elevational view illustrating the internal construction for a further embodiment of the inventive apparatus.

FIG. 4 is a removed sectional elevational view illustrating the internal construction of the inventive apparatus wherein a plurality of heat exchanger means are provided.

Referring to FIG. 4, there is shown a portion of the vertically elongated chamber 1. There is also shown two heat exchangers 6 and the vertically elongated baffle means 11 which are attached to the chamber wall 1 in a manner sufficient to provide a confined conduit zone 21 between the wall of the chamber and the face of the vertical baffle means. In addition, there is provided between the heat exchanger means 6 a pair of second vertical baffle means 24 which are spaced apart in a manner sufficient to provide a space 25 between the faces of baffle means 24. The fluid contacting zone 23 containing fluid inlet means 9 and 10, not shown, and the vaporization zone 6 are thus confined by baffle means 11, 12, and 24. When operating the apparatus which is schematically shown in FIG. 4, a portion of the nonvaporized thermally unstable liquid will flow downwardly via the space 21 and a portion thereof will flow downwardly via the space 25.

The manner of operation of the apparatus when a plurality of heat exchanger means 6 is provided will be readily apparent to those skilled in the art from the teachings which have been presented hereinabove, particularly in the discussion relative to FIG. 2.

PREFERRED EMBODIMENT

From the foregoing discussion, the process of the present invention and its advantages may be clearly understood by those skilled in the art. Furthermore, the basic elements of the inventive apparatus and its advantages have been made equally clear.

In particular, it may be seen that many problems of the prior art solvent regeneration process have been eliminated in the process which has been described in the example hereinabove. In the processes herein described, the nonvaporized fraction of the solvent composition is returned via conduit zone 21 to a lower settling zone 22 below the heat exchanger means 6 without being passed through the vaporization zone. Since a portion of the sulfolane solvent has been vaporized, the concentration of relatively nonvolatile contaminants in the liquid fraction which circulate downward into the lower settling zone 22 is increased. Therefore, at least a portion of the relatively nonvolatile contaminants will precipitate out of solution in lower separation zone 22. These precipitated contaminants, therefore, do not foul heat exchanger 6.

In addition, the utilization of the stripping steam provides a means of reducing the partial pressure of the thermally unstable sulfolane solvent without requiring the imposition of high vacuum on the apparatus. In prior art operations wherein sulfolane solvent is regenerated, vacuums in the region of 20 mm. of Hg absolute are typical. At such a high vacuum, a certain amount of air leakage in the apparatus will occur thereby further promoting the thermal degradation of the sulfolane solvent and production of relatively nonvolatile contaminants. In contrast, by the process of the present invention as illustrated by the example hereinabove, a vacuum of only 550 mm. of Hg absolute was necessary.

The utilization of the stripping steam also affords further advantage since fresh sulfolane solvent composition continually enters the process of the present invention below the heat exchanger 6 and since stripping steam also enters below the heat exchanger. The heat exchanger is, thus, continually swept by a fluid mixture which is reduced in the concentration in the relatively nonvolatile contaminants. Thus, the tendency to precipitate out on the heat exchanger surfaces is reduced. Furthermore, the stripping steam tends to scour the tube surfaces clean, thereby further decreasing the tendency of the heat exchanger surfaces to be fouled by the deposition of the tarry relatively nonvolatile contaminants.

Additionally, the stripping steam provides a continuous circulation of fluid across the heat exchanger tubes of the internal reboiler device. This is in contrast to the prior art method of operation whereby a liquid inventory encompasses the internal heat exchanger with no positive fluid flow other than what is caused by natural convection and vaporization. The upflowing stripping steam provides a vapor lift within the apparatus thus producing a positive flow without producing a pressure increase due to pressure drop. The liquid level therefore overflows the baffle means 11 and flows into the lower settling zone 22 wherein the tarry insoluble deposition products may precipitate.

Further advantages of the present invention are readily ascertainable to those skilled in the art.

While the example discussed hereinabove has been directed to the regeneration of a sulfolane solvent composition by vaporization, the invention is not so limited. Any organic chemical fluid stream containing thermally unstable constituents may be so processed. A number of such thermally unstable organic chemicals have been discussed hereinabove but the inventive process is not limited to those specifically mentioned herein. It will be readily apparent to those skilled in the art that the thermally unstable chemicals which may be processed within the scope of the present invention are any organic chemicals which are susceptible to any thermal degradation such as discoloration, dehydrogenation, cracking, condensation, polymerization, etc., which is caused by subjecting the organic chemical in question to excessive temperature levels during the vaporization.

In addition, the example hereinabove disclosed a process wherein the pressure was reduced by means of stripping with an inert vapor while a vacuum was imposed upon the system. However, the vapor pressure reduction which is necessary for vaporization below the level of thermal instability may be provided by stripping with the inert vapor alone. Those skilled in the art will realize that the process herein described will function at atmospheric pressure or even superatomspheric pressure, depending upon the specific chemical being separated from relatively nonvolatile contaminants. The only limitation upon the process of the present invention is that the pressure and other operating conditions not be so severe as to create a vaporization temperature which exceeds the level of thermal instability of the thermally unstable compound.

Furthermore, those skilled in the art will quickly perceive that the inert vapor stripping medium utilized in the process of the present invention need not be steam. Any vapor may be utilized which is chemically inert under the operating conditions which are maintained within the inventive process. Thus, the inert vapor stripping medium could be nitrogen, helium, hydrogen, methane, ethane, as well as steam, depending upon the specific chemical environment of the process. However, for the solvent compositions which have been defined hereinabove, the preferred inert vapor stripping medium is steam.

In the foregoing discussion, a vapor-liquid contacting zone 19 was provided within the inventive apparatus which comprised typical wire mesh demisting pads. The present invention may be practiced, however, where the vapor-liquid contacting zone comprises a region containing fractionation trays or a region containing an inert packing material of the type well known to those skilled in the art. While the vapor-liquid contacting zone 19 discussed hereinabove served only to remove entrained liquid from the vapor passing therethrough, the vapor-liquid contacting zone may, in some applications of the inventive process and apparatus, comprise a rectification zone, or a stripping zone, or a combined rectification and stripping zone.

Further modification of the apparatus disclosed will also be apparent to those skilled in the art. For example, the preferred embodiment shows the feed liquid entering via an inlet means 10 and the stripping medium entering via inlet means 9. However, the liquid feed and the stripping medium could be combined externally to the apparatus in the piping leading thereto, so that a mixture of liquid feed and stripping medium would enter the apparatus by means of a single inlet means. In addition, the heat exchanger means 6 has been illustrated as a single heat exchanger bundle. Those skilled in the art will realize that the heat exchanger means 6 may comprise more than one heat exchanger bundle. For example, in FIG. 4, the plurality of heat exchanger means 6 is shown in a side by side configuration. However, in each instance there may be additional tube bundles provided below the exchanger bundles shown.

It must be pointed out that although the inventive apparatus which has been discussed hereinabove has specific application to the vaporization of thermally unstable organic compounds, the apparatus is not so limited. The apparatus could additionally be used as a chemical reactor, or it could be used as a single stage liquid-liquid extraction apparatus. When the apparatus is used as a liquid-liquid extraction apparatus, the preferred operation would be to introduce the lower density liquid in the lower inlet means 9 and the more dense liquid in the upper inlet means 10.

These and other modifications to the process of the present invention and to the apparatus of the present invention, are readily ascertainable to those skilled in the art. These and other similar modifications should in no way be construed to detract from the broadness of the present invention.

However, it may be summarized that one particularly preferred embodiment of the present invention may be characterized as a fluid contacting apparatus which comprises in combination a vertically elongated confined chamber having at least one upper fluid port and one lower fluid port; a pair of vertically elongated baffle means within the chamber, positioned a first finite distance below the upper fluid port and a second finite distance above the lower fluid port, attached to the vertical wall of the chamber in a manner sufficient to provide a space confined between the wall of the chamber and the face of the baffle means; heat exchanger means positioned between the baffle means at a first locus and fluid inlet means positioned between the baffle means at a locus below the first locus.

A further preferred embodiment of the present invention may be characterized as a fluid contacting apparatus which comprises in combination a vertically elongated confined chamber having at least one upper fluid port and one lower fluid port; a pair of vertically elongated first baffle means within the chamber, positioned a first finite distance below the upper fluid port and a second finite distance above the lower fluid port attached to the vertical wall of the chamber in a manner sufficient to provide a space confined between the chamber wall and the face of the baffle means; a plurality of heat exchanger means positioned between the first baffle means; at least one vertically elongated second baffle means positioned between adjacent heat exchanger means at the first finite distance below the upper fluid port and at the second finite distance above the lower fluid port, attached to the vertical wall of the chamber in a manner sufficient to confine the heat exchanger means between vertical baffle means; and fluid inlet means positioned below each heat exchanger means and confined therewith between vertical baffle means.

In addition, a preferred embodiment of the present invention may be characterized as an improvement in a process for separation of an organic chemical liquid feed containing at least one thermally unstable constituent and containing relatively nonvolatile contaminants, to provide a vapor product comprising thermally unstable constituent having substantial freedom from relatively nonvolatile contaminants, within a vaporization apparatus comprising a confined vertically elongated shell containing heat exchanger means disposed therein, which improvement comprises a method for producing the vapor product below the level of thermal instability of the unstable constituent by passing the liquid feed into a fluid contacting zone confined within the apparatus, below the heat exchanger means and between a first conduit zone and a second conduit zone; passing an inert vapor stripping medium into the fluid contacting zone; passing a first liquid fraction hereinafter specified into the fluid contacting zone, under conditions sufficient to provide a fluid mixture comprising liquid feed, stripping medium, and first liquid fraction; passing the fluid mixture into a vaporization zone above the contacting zone, comprising the heat exchanger means, and confined between the first conduit zone and the second conduit zone; maintaining the vaporization zone under conditions sufficient to vaporize at least a portion of the thermally unstable constituent at a temperature below the level of thermal instability; passing a vapor-liquid mixture from the vaporization zone into an upper separation zone confined within the apparatus above the vaporization zone, and above the first conduit zone and the second conduit zone; separating the vapor-liquid mixture to provide a vapor fraction comprising stripping medium and thermally unstable constituents having substantial freedom from relatively nonvolatile contaminants, and a second liquid fraction containing relatively nonvolatile contaminants; passing the second liquid fraction from the upper separation zone into the first conduit zone and into the second conduit zone; passing the second liquid fraction from the first conduit zone and from the second conduit zone into a lower separation zone contained within the apparatus below the fluid contacting zone; passing at least a portion of the second liquid fraction from the lower separation zone into the fluid contacting zone as the first liquid fraction specified; and withdrawing at least a portion of the vapor fraction from the apparatus as the desired vapor product.

The invention claimed is:

1. A liquid vaporizing apparatus which comprises in combination:
  (a) a vertically elongated confined chamber having at least one upper vapor outlet port and one lower liquid outlet port;
  (b) at least one vertically elongated baffle means positioned within said chamber having an inner and an outer baffle face, said baffle means having an upper end spaced below said upper port a distance sufficient to provide a vapor-liquid separation zone therebetween, the lower end of said baffle means being spaced above said lower port a distance sufficient to provide a liquid separation zone therebetween, said baffle means being attached to the vertical wall of said chamber in a manner sufficient to provide a space defined by said chamber wall and the outer face of said baffle means;
  (c) heating means within said chamber, said heating means having a heat exchange surface positioned between the vertical wall of said chamber and the inner face of said baffle means intermediate said ends of said baffle means, whereby said heating means is isolated in part by said baffle means from said defined space;
  (d) liquid inlet means projecting into said chamber having liquid distributing means positioned below said heat exchange surface, between the vertical wall of said chamber and the inner face of said baffle means but within the horizontal extremities of said surface and intermediate said ends of said baffle means, said liquid distributing means being oriented to induce liquid flow across the heat exchange surface of said heating means and through said defined space by fluid circulation around said baffle means; and
  (e) a vapor stripping means positioned below said liquid distributing means but above said lower end of said baffle means.

2. A liquid vaporizing apparatus which comprises in combination:
  (a) a vertically elongated confined chamber having at least one upper vapor outlet port and one lower liquid outlet port;
  (b) a pair of substantially vertical, parallel elongated baffle means positioned within said chamber, each having an inner and an outer baffle face, said baffle means having upper ends spaced below said upper port a distance sufficient to provide a vapor-liquid separation zone therebetween, the lower ends of said baffle means being spaced above said lower port a distance sufficient to provide a liquid separation zone therebetween, said baffle means being attached to the vertical wall of said chamber in a manner sufficient to provide a pair of spaces defined by said chamber wall and the outer faces of said baffle means;
  (c) a plurality of heat exchanger means within said chamber, said last named means having heat exchange surfaces positioned between the inner faces of and intermediate said upper and lower ends of said baffle means, whereby said heating means is isolated in part by said baffle means from said defined spaces, said heat exchanger means being positioned in side-by-side spacial orientation;
  (d) liquid inlet means projecting into said chamber having liquid distributing means positioned below said heat exchange surfaces between the inner faces of said baffle means and intermediate said upper and lower ends of said baffle means, said liquid distributing means being oriented to induce liquid flow across the heat exchange surfaces of said heating means and through said defined spaces by fluid circulation around said baffle means;
(e) a vapor stripping means positioned below said liquid distributing means but above said lower ends of said baffle means; and
(f) said heating means, said liquid inlet means and said vapor stripping means being confined between the inner faces of said baffle means.

3. The invention as defined in claim 2 wherein at least one additional vertically elongated baffle means is positioned between adjacent heat exchanger means in a manner sufficient to separate at least a portion of said pluraliay of heat exchanger means, and an additional liquid inlet means and additional vapor stripping means are arranged so that a liquid inlet means and a vapor stripping means are located as in claim 21 under respective heat exchange means.

4. The invention as defined in claim 3 wherein said vapor stripping means is provided with vapor distributing means.

References Cited

UNITED STATES PATENTS

| | | | |
|---|---|---|---|
| 1,258,562 | 3/1918 | Harris | 202—200X |
| 1,284,945 | 11/1918 | Swan | 159—28 |
| 2,499,302 | 2/1950 | Emhardt | 159—28 |
| 3,056,831 | 10/1962 | Stratford | 261—141 |
| 3,193,361 | 7/1965 | Niedner | 23—273LX |
| 3,477,915 | 11/1969 | Gantt et al. | 203—99X |

FOREIGN PATENTS

| | | |
|---|---|---|
| 26,388 | 11/1923 | France. |
| | | (1st addition to France 553,310) |
| 700,826 | 12/1953 | Great Britain. |
| 1,012,338 | 12/1965 | Great Britain. |

NORMAN YUDKOFF, Primary Examiner

J. SOFER, Assistant Examiner

U.S. Cl. X.R.

159—26; 203—49, 96; 202—163, 233; 208—325